(12) United States Patent
Schwarz et al.

(10) Patent No.: US 8,827,673 B2
(45) Date of Patent: Sep. 9, 2014

(54) DEVICE FOR DRY-FORMING A FIBROUS WEB

(71) Applicant: Oerlikon Textile GmbH & Co. KG, Remscheid (DE)

(72) Inventors: Olaf Schwarz, Neumünster (DE); Ingo Mählmann, Itzehoe (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 0 days.

(21) Appl. No.: 13/890,447

(22) Filed: May 9, 2013

(65) Prior Publication Data

US 2013/0251839 A1 Sep. 26, 2013

Related U.S. Application Data

(63) Continuation-in-part of application No. PCT/EP2011/070366, filed on Nov. 17, 2011.

(30) Foreign Application Priority Data

Nov. 19, 2010 (DE) .......................... 10 2010 052 010

(51) Int. Cl.
*D04H 1/74* (2006.01)
*B29C 47/00* (2006.01)
*D04H 1/732* (2012.01)

(52) U.S. Cl.
CPC ............ *B29C 47/0009* (2013.01); *D04H 1/732* (2013.01)
USPC ...................................................... 425/83.1

(58) Field of Classification Search
USPC ............................................... 425/81.1, 83.1
See application file for complete search history.

(56) References Cited

U.S. PATENT DOCUMENTS 2,689,597 A * 9/1954 Kinnear ........................... 264/70
3,509,604 A * 5/1970 Furbeck ........................ 425/81.1

(Continued)

FOREIGN PATENT DOCUMENTS

DE 2 149 892 4/1972
EP 0 006 696 1/1980

(Continued)

OTHER PUBLICATIONS

PCT/EP2011/070366 International Search Report dated Feb. 3, 2012 (6 pages including 3 page English translation).
PCT/EP2011/070366 International Preliminary Report on Patentability dated May 21, 2013 (6 pages including 3 page English translation).

*Primary Examiner* — Yogendra Gupta
*Assistant Examiner* — Joseph Leyson
(74) *Attorney, Agent, or Firm* — Brinks Gilson & Lione; G. Peter Nichols

(57) ABSTRACT

A device for dry-forming a fibrous web, in which a plurality of fibers or fiber mixtures is supplied to a forming head by means of an air flow, is described. The forming head includes a forming outlet arranged above a gas-permeable deposit belt. The fibers deposited on the deposit belt within a forming zone are continuously conveyed out of the forming zone by the deposit belt. A clearance of the forming zone formed between the forming head and the deposit belt is shielded with respect to the surroundings by several sealing means. To obtain as uniform a composition of the fiber layer as possible when depositing the fibers, the sealing means arranged on a feed side forms an inlet opening having an adjustable inflow cross-section through which a defined secondary air flow flows from the surroundings into the clearance.

12 Claims, 3 Drawing Sheets

(56) References Cited

U.S. PATENT DOCUMENTS

| | | | | |
|---|---|---|---|---|
| 3,792,943 | A | * | 2/1974 | Helgesson ............ 425/83.1 |
| 4,123,211 | A | * | 10/1978 | Rudloff ............... 425/82.1 |
| 4,276,248 | A | | 6/1981 | Widnell |
| 4,952,128 | A | * | 8/1990 | Marshall et al. ........ 425/82.1 |
| 5,269,049 | A | | 12/1993 | Gustafsson et al. |
| 5,445,777 | A | | 8/1995 | Noel et al. |
| 6,402,492 | B1 | * | 6/2002 | Achterwinter et al. ... 425/72.2 |
| 2004/0231108 | A1 | | 11/2004 | Thordahl |

FOREIGN PATENT DOCUMENTS

| | | |
|---|---|---|
| EP | 0 536 904 | 4/1993 |
| WO | WO 03/016605 | 2/2003 |
| WO | WO 2004/106604 | 12/2004 |
| WO | WO 2006/131122 | 2/2006 |

* cited by examiner

DEVICE FOR DRY-FORMING A FIBROUS WEB

This application is a continuation-in-part of and claims the benefit of priority from PCT application PCT/EP2011/070366 filed Nov. 17, 2011 and German Patent Application DE 10 2010 052 010.1 filed Nov. 19, 2010, the disclosure of each is hereby incorporated by reference in its entirety.

BACKGROUND

The invention concerns a device for dry-forming a fibrous web.

For the production of nonwovens it is known that the fibers are deposited by means of an air flow onto a deposit belt to form a fibrous layer. This method, typically referred to in the field as an airlaid method is based on the fibers or fiber mixtures being deposited such that they are uniformly distributed by means of a forming head onto the upper surface of a deposit belt. The zone covered by the forming head on the deposit belt is normally referred to as the forming zone, in which the fibers are joined on the deposit belt.

A device of this type is known, for example, from EP 0 006 696 A1.

With the known devices, a plurality of fibers or fiber mixtures is supplied by means of an air flow to a forming head. Means are provided within the forming head for mixing and distributing the fibers. A forming outlet is formed on the bottom surface of the forming head, which is typically disposed at a short spacing above the deposit belt. As a result, an empty space is formed between the forming head and the deposit belt, which serves for the supplying of a fiber flow exiting the forming outlet. The depositing of the fibers onto the deposit belt is supported by a suction device, which receives and discharges the air from the fiber flow. The fibrous layer formed on the upper surface of the deposit belt is continuously transported out of the forming zone via the deposit belt, such that a fibrous layer is obtained, which is subsequently supplied to a further processing, such as a solidification process, for example.

The depositing of the fibers is substantially determined by the air flow generated in the forming zone. With the known device, the forming head is on the entry end of the deposit belt, and sealing means in the form of sealing rollers are disposed at the output end of the deposit belt, respectively, in order to shield the empty space formed between the forming outlet and the deposit belt from the surrounding environment. The sealing rollers work together with housing components disposed on the longitudinal surfaces of the deposit belt in order, thereby, to prevent the entry of secondary air flows from the surrounding environment. In practice, however, it has been the case that depending on the type of fiber, and the size of the fiber, irregularities arise in the depositing of the fibers, which are referred to as so-called cloud formations. In this respect, it is believed that the suction flows generated by the suction device may lead to irregularities in the fiber deposit.

In order to eliminate irregularities of this type in the depositing of the fibers, it is known, for example, from WO 2006/131122 A1, to influence the suction flow of the suction device in sub-sections of the forming zone. With the known device, a baffle is associated with an entry end of the forming zone of the suction device, which influences the suction flow beneath the deposit belt. As a result, air turbulence at the entry end of the forming zone, in particular, which occurs as a result of secondary air from the surrounding environment being suctioned into this area, is prevented. As a result, however, varying suction flows occur in the forming zone, which lead to differing deposit behaviors of the fibers within the forming zone.

SUMMARY

It is thus an objective of the invention to create a generic device for the dry-forming of a fibrous web, with which a high degree of uniformity in the fiber distribution within the fibrous layer can be obtained.

This objective is attained in accordance with the invention by disposing a sealing means at the entry end in relation to the deposit belt to form an entry opening having an adjustable inflow cross-section in relation to the surrounding environment.

Advantageous further developments of the invention are described in the following description.

The invention is based on the fact that with the depositing of the fibers onto the deposit belt moving transversally in relation to the forming outlet, a reorientation of the fibers must occur, from a vertical movement to a horizontal movement defined by the deposit belt. Thus, it has been determined that by means of a controlled supplying of a secondary air flow to the entry end, the reorientation, and thereby the depositing, of the fibers can be influenced in a positive manner thereby, such that an evening out of the depositing of the fibers occurs. In this respect, the entry opening having an adjustable inflow cross-section offers the advantage of enabling a supplying of a secondary air flow from the surrounding environment adjusted to the type of fiber and the size of the fibers into the forming zone. By means of the secondary air flow entering at the entry end, the fibers are advantageously accelerated in the direction of movement of the deposit belt, which is beneficial for the reorientation. In addition, it is obtained thereby that the fibers protruding from the forming outlet in the region of the entry end, in relation to the fibers protruding in the region of the output end within the empty space, pass through open areas of different lengths. As a result, the fibers in the entry region receive, in particular, a longer time period within the open area for the reorientation to the direction of movement of the deposit belt. These effects have a particularly positive influence on the uniform depositing, and thereby on a fibrous web generated in a uniform manner.

In order to enable an individual adjustment to the secondary air flow, the device according to the invention includes sealing means at the entry end formed by a moveable sealing plate at the entry end, which determines the inflow cross-section of the feed opening with its respective adjustment in relation to the deposit belt. In this manner it is possible to adjust the inflow cross-section of the feed opening in a continuous manner.

For this, it is proposed that the sealing plate be retained at a pivotal axis, which extends transversally, spaced from the deposit belt. As a result, it is possible to adjust the feed opening ranging from a closed state to a state in which it is open to the maximum possible extent.

In order to obtain the least possible secondary air flow entering from the surrounding environment and according to an advantageous further development of the invention, the sealing means at the output end is formed of a sealing roller, which can be driven at a circumferential speed. As a result, the sealing roller can be supported with a minimal contact to the surface of the deposited fibrous web. For this, the circumferential speed of the sealing roller is preferably equal to a belt speed of the deposit belt. As a result, it is possible to prevent undesired relative speed differences between the sealing roller and the fibrous web.

In order to ensure that the sealing roller in relation to the deposit belt includes an optimal setting for the respective fibrous web, the sealing roller is designed such that it can be adjusted in terms of height in relation to the deposit belt. As a result it is possible to obtain an optimal sealing of the forming zone at the outlet end of the deposit belt for any thickness of the fibrous web.

In order for the height of the gap adjusted between the sealing roller and the deposit belt to remain constant during operation, it is furthermore proposed that a cleaning agent be associated with the sealing roller, by means of which the outer surface of the sealing roller can be cleaned. As a result, adhesion of individual fiber particles on the circumference of the sealing roller can be prevented. Cleaning agents of this type can be obtained, for example, directly, by means of contact with a scraper, or without contact, by means of a vacuum.

The longitudinal surfaces of the forming zone are advantageously shielded from the surrounding environment by means of sealing walls, wherein the sealing walls at the entry end include a wall end extending beyond the forming zone. As a result, the edge turbulence effect generated by the entry of the secondary air flow can be kept out of the forming zone. Alternatively, the wall ends of the sealing wall may be designed such that they can be extended at the longitudinal surfaces, such that, depending on the size of the inflow cross-section of the feed opening, sealing walls adjusted to different lengths can be obtained.

In order to be able to obtain different adjustments to the width of the forming zone, it is furthermore proposed that the sealing walls are designed such that they can be adjusted in order to adjust for a deposit width transversal to the deposit belt.

A further particularly advantageous development of the invention provides that the suction device includes numerous air guidance means, by means of which a suction profile oriented to the plane of the wall can be adjusted. As a result, additional deposit effects and uniformity in the depositing of the fibers to the fibrous web can be generated.

Likewise, in particular, the suctioned in secondary airflow can be modified thereby.

In order to be able to deposit the greatest variety of types and sizes of fibers to the fibrous web, it is furthermore proposed that the forming head is designed such that it can be adjusted in terms of height in relation to the deposit belt.

The device according to the invention is thus suited for the depositing of any type of fibers and fiber mixtures. As such, it is possible to deposit synthetic or natural fibers, or mixtures of synthetic and natural fibers onto fibrous layers. As a result of the high degree of uniformity in the fibrous layer that is generated, it is also possible to advantageously integrate preferably very fine particles into the mixture, in the form of a powder, for example.

BRIEF DESCRIPTION OF THE DRAWINGS

The device according to the invention shall be explained in greater detail in the following, by means of a few embodiment examples in reference to the attached figures.

DESCRIPTION

Figure 1:
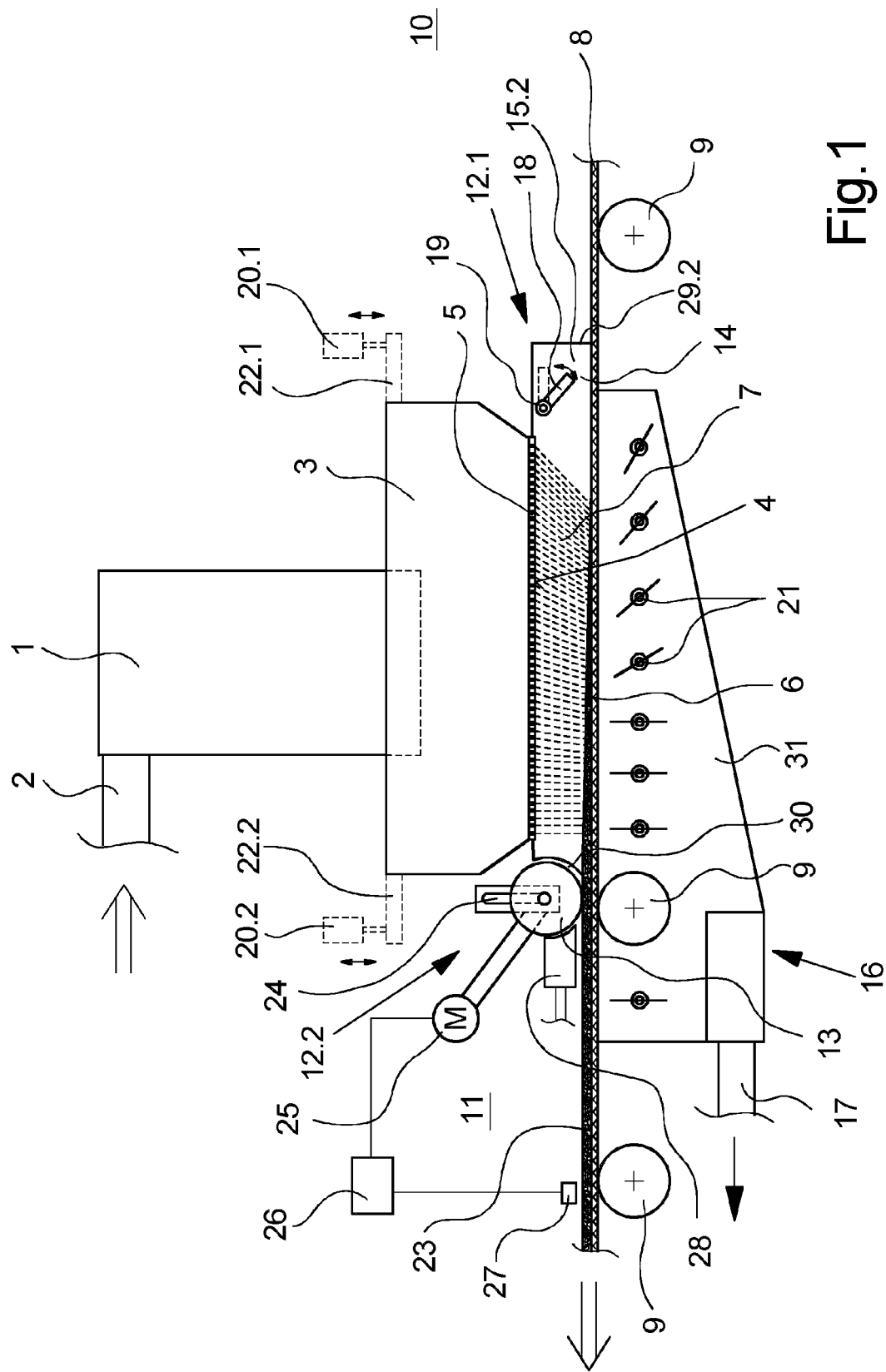
FIG. 1 shows schematically, a cross-section view of a first embodiment example of the device according to the invention.
Figure 2:
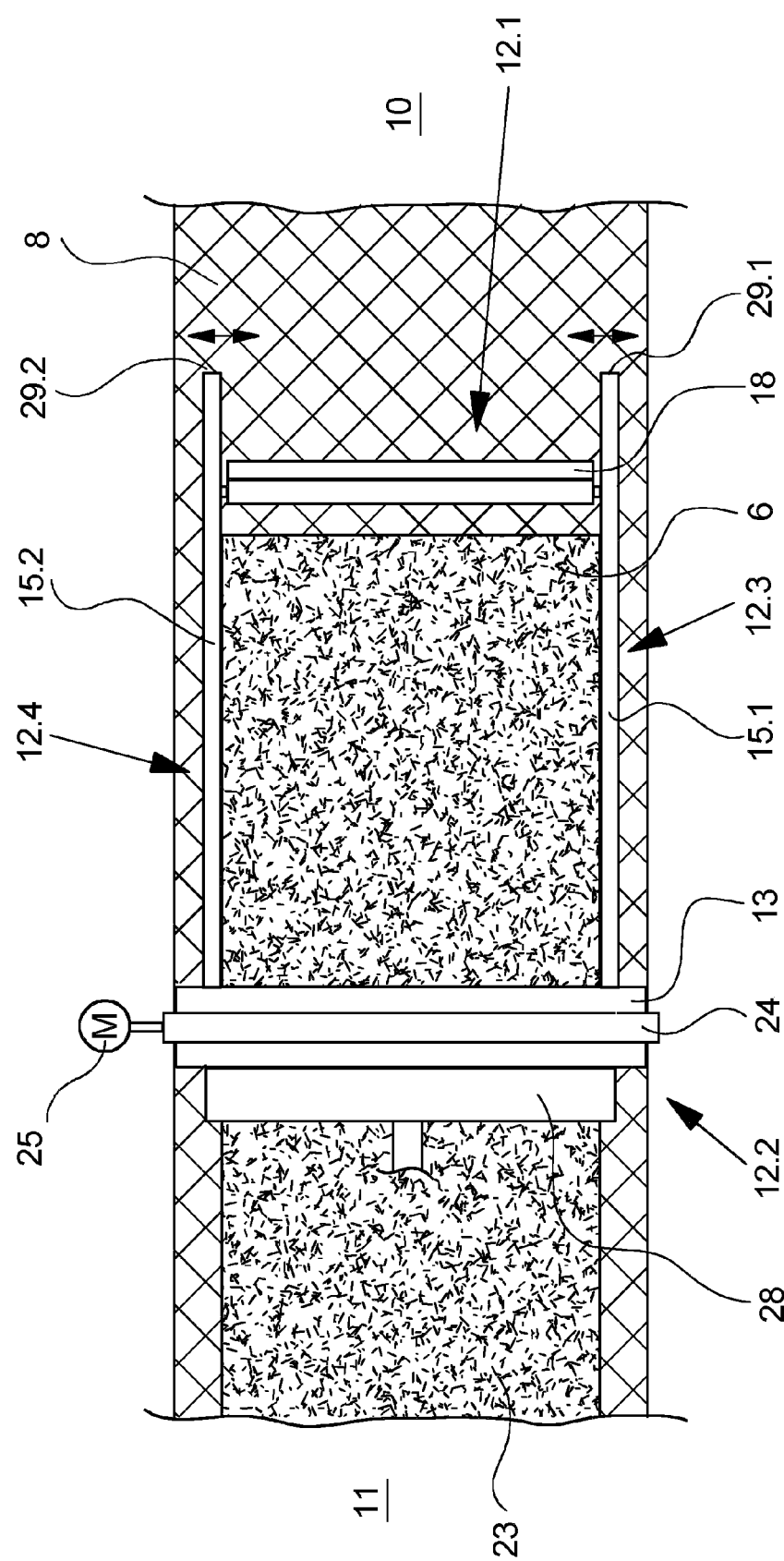
FIG. 2 shows schematically, a top view of the embodiment example from FIG. 1, without the forming head.

A first embodiment of the device according to the invention is shown schematically in FIGS. 1 and 2. In FIG. 1, the embodiment is schematically depicted in a cross-section view, and in FIG. 2 a top view is shown, without a forming head. To the extent that no express reference is made to one of the figures, the following description applies to both figures.

The device of the first embodiment includes a mixing chamber 1, which is connected via a fiber feed 2 to a fiber supply, which is not shown here. The fiber feed 2 can contain one or more connections for supplying one or more fibers or fiber mixtures to the mixing chamber 1 by means of an air flow. The mixing chamber 1 is connected at a bottom surface to a forming head 3. The forming head 3 includes numerous means, not shown here in greater detail, for distributing the fibers or fiber mixtures, and evenly discharging said fibers, as a fiber flow, at the forming outlet 4 formed on the bottom surface. The forming outlet 4 preferably includes a sieve plate 5 or a taut screening web. Accordingly, the distribution occurs within the forming head 3, preferably via numerous powered blades, such as is known, for example, from WO 2004/106604.

The forming head 3 is disposed above a deposit belt 8 such that the forming outlet 4 extends above and parallel to the deposit belt 8. The substantially horizontal deposit belt 8 is designed such that it is gas permeable, and is continuously guided via a plurality of guide rollers 9 in a material supply device, indicated by a double arrow. To this extent, the deposit belt 8 runs continuously through a forming zone 6 from an entry end 10 to an outlet end 11. Thus, the fibers are deposited to form a fibrous layer 23 in the forming zone 6 on the surface of the deposit belt 8.

The forming outlet 4 of the forming head 3 is designed to be rectangular in this case, such that the forming zone 6 above the deposit belt 8 is also rectangular. An empty space 7 of the forming zone 6, formed between the forming outlet 4 and the deposit belt 8, is shielded from the surrounding environment by means of a plurality of sealing means 12.1-12.4. The sealing means 12.1 disposed at the entry end 10 form an open feed opening 14 opposite the deposit belt 8, so that the empty space 7 of the forming zone 6 is directly connected to the surrounding environment. The feed opening 14 forms an open inflow cross-section to enable an inflow of a secondary air flow from the surrounding environment. In order to adjust to a specific inflow cross-section, the sealing means 12.1 in this embodiment includes a movable sealing plate 18. Consequently, a specific inflow cross-section of the feed opening 14 is set by respectively adjusting the sealing plate 18 in relation to the deposit belt 8. For this purpose, the sealing plate 18 may be mounted on a pivotal axis 19, which extends transversally to the deposit belt 8. The sealing plate 18 can be adjusted in an analog manner over the pivotal axis 19 between a closed setting and a maximum open setting. The maximum opening of the sealing plate 18 is illustrated in FIG. 1 with a broken line.

The empty space 7 in the forming zone 6 is shielded at the outlet end 11 against the surrounding environment by means of a sealing means 12.2. The sealing means 12.2 is designed as a powered sealing roller 13. The sealing roller 13 is mounted in a roller rack 24 such that it can be adjusted in terms of height. Thus, it is possible to adjust the height of the sealing roller in relation to the deposit belt 8 in an analog manner, in order to obtain a shielding adjusted to the thickness of the fibrous layer. The sealing roller 13 is powered by means of a roller motor 25, which is coupled to a control device 26. A sensor 27 is associated with the control device 26, which detects the respective belt speed of the deposit belt 8. To this extent, it is possible to operate the sealing roller 13 at a circumferential speed that is the same as the belt speed of the deposit belt 8. As a result, it is possible to guide the surface of the sealing roller 13 and the surface of the fibrous layer 23 at the same speed, without any relative motion with respect to one another.

In order to maintain a set clearance between the deposit belt 8 and the sealing roller 13, a cleaning agent 28 is associated with the sealing roller 13. The cleaning agent 28 in this embodiment is designed as a suction device for continuously suctioning off fiber particles adhering to the surface of the sealing roller 13.

The empty space 7 of the forming zone 6 is shielded at both longitudinal surfaces from the surrounding environment by means of the sealing means 12.3 and 12.4, formed between two parallel sealing walls 15.1 and 15.2. The sealing walls 15.1 and 15.2 extend thereby between an upper surface of the deposit belt 8 and a lower surface of the forming head 3. The sealing walls 15.1 and 15.2 each form a clearance 30 in relation to the sealing roller 13. The opposing wall ends 29.1 and 29.2 are designed to be longer, and extend beyond the forming zone 6. Thus, it is possible to advantageously displace the occurrence of edge turbulences, which arise with the entry of a secondary air flow from the surrounding environment, preferably to an uncritical region lying outside of the forming zone 6. For the purpose of adjusting a deposit width of the forming zone 6, the sealing walls 15.1 and 15.2 are designed such that they can be adjusted transversally to the deposit belt 8. For this, an exchange of the sealing means 12.1 occurs, in order to form a feed opening adjusted to the respective deposit width.

A suction device 16 is disposed beneath the deposit belt 8, connected to a vacuum source, not shown here, by means of a suction channel 17. The suction device 16 forms a vacuum chamber 31 beneath the deposit belt 8, in which a plurality of air guidance means 21 are associated with the bottom surface of the deposit belt 8. In this embodiment, the air guidance means 21 are formed by adjustable damper flaps, which can be adjusted independently of one another, such that a suction profile can be adjusted over the length of the forming zone 6. Thus, it is possible, particularly by means of the air guidance means 21 associated with the entry end 10, to influence the secondary air flow entering through the feed opening 14.

In the embodiment of the device according to the invention depicted in FIGS. 1 and 2, a mixture of synthetic fibers, for example, is fed to the mixing chamber together with a powder via an air flow. Static or dynamic means can be formed within the mixing chamber 1, which execute a pre-mixing of the fibers. Subsequently, the mixture of fibers and powder is fed via the air flow into the forming head 3. A distribution of the fiber-powder mixture occurs within the forming head 3 via the distribution means, which is subsequently fed to the empty space 7 as a fiber flow via the forming outlet 4. A continuously acting suction flow is generated via the suction device 16 within the forming zone 6, which, on one hand, receives fibers entering the empty space 7, and on the other hand, causes a secondary air flow entering at the feed end 10 from the surrounding environment, which flows through the feed opening 14. With the guidance of the fibers within the empty space 7, the fibers of the fiber flow are accelerated in the running direction of the deposit belt 8 in the region of the entry end 10, with the effect that the fibers pass through a longer open path before being deposited on the deposit belt 8, and already are pre-oriented in a manner favorable to the reorientation from the vertical movement to a horizontal movement. In contrast, the fibers are not substantially accelerated at the opposite outlet end 11, such that they pass through a shorter open path in relation to the fibers at the feed end 10. Thus, it is possible for the fibers to be deposited in the direction of the material flow with a slight pre-orientation by means of the effect of a secondary air flow at the feed end. This has been shown to be particularly advantageous in the formation, specifically, of a uniform fibrous layer 23.

At the outlet end 11 opposite of the forming head 3, suctioning in of a secondary air is prevented by means of the sealing roller 13. In this respect, only the effect of the secondary air allowed to enter via the feed opening 14 remains in the forming zone 6, which can be implemented in a targeted manner in order to improve the depositing of the fibers.

The device according to the invention is particularly suited for obtaining a high degree of uniformity in the generation of fibrous layers, formed by a plurality of individual, finite fiber sections. For this, synthetic or natural fibers, or a mixture of synthetic and natural fibers can be deposited.

Depending on the size and type of the fibers, the spacing between the forming outlet 4 and the deposit belt 8 can be advantageously altered by designing the forming head 3 such that it can be adjusted in terms of its height. For the height adjustment, two actuators 20.1 and 20.2, for example, may be used, each of which engage with a supporting arm 22.1 and 22.2, which are connected in a permanent manner to the forming head 3. In FIG. 1, the actuators 20.1 and 20.2 as well as the support arms 22.1 and 22.2 are depicted by means of a broken line. It is thus possible to expand the sealing of the forming zone 6 in the case of greater spacings between the forming outlet 4 and the deposit belt 8 in an advantageous manner by means of additional sealing walls on all sides of the forming zone 6.

Figure 3:
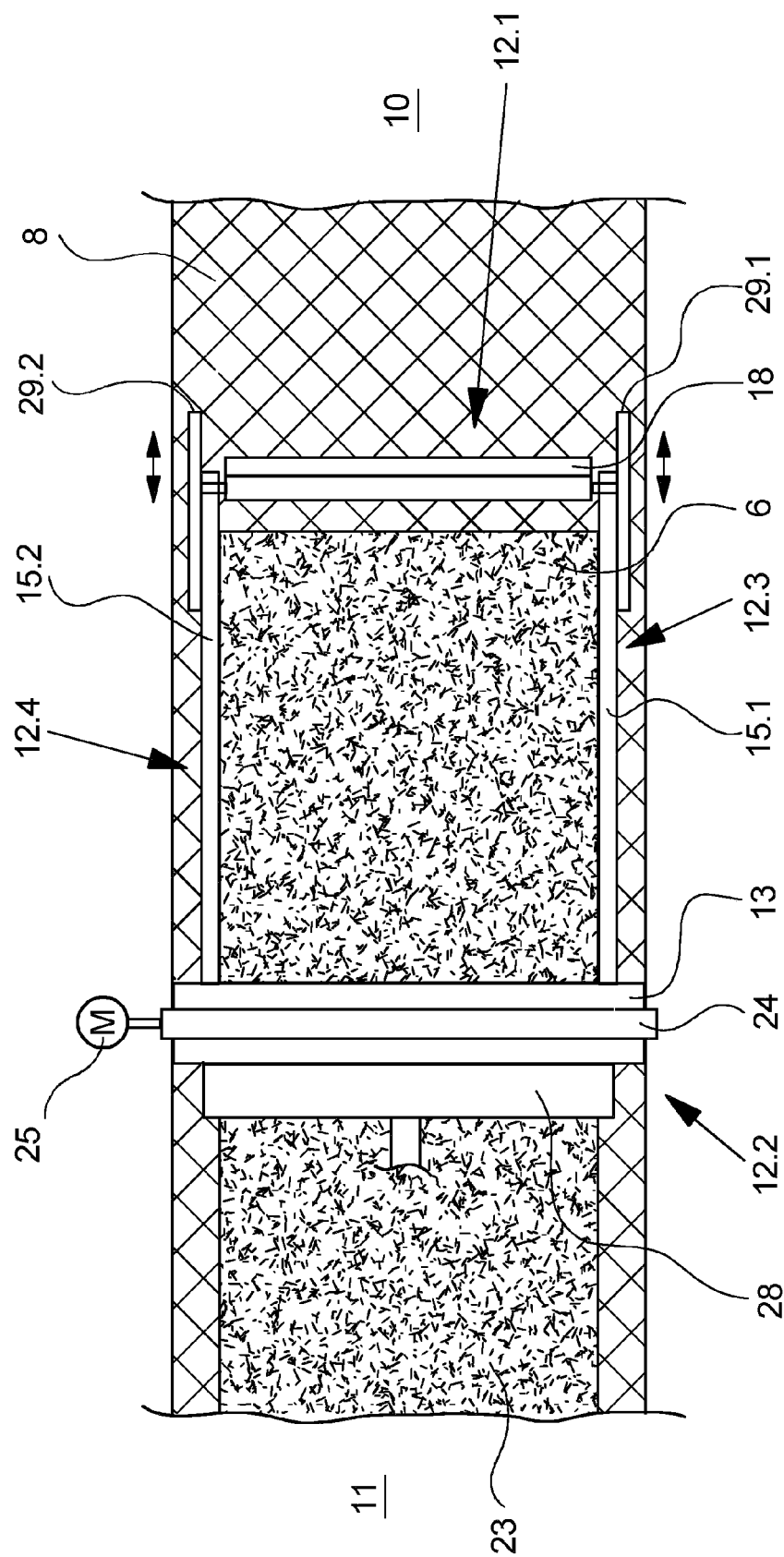
FIG. 3 shows schematically, a top view of another embodiment example of the device according to the invention, without the forming head.

In order to optimize the forming zone, in particular with the entry of the secondary air flow at the entry end, another embodiment example of the device according to the invention is shown in FIG. 3, in a top view of the forming zone 6. This embodiment is substantially identical to the embodiment example according to FIG. 1 and FIG. 2, such that in the following only the differences shall be explained, and otherwise, reference is made to the aforementioned description. As such, this embodiment is identical in the cross-section view to the embodiment example according to FIG. 1.

With the embodiment depicted in FIG. 3 the sealing means 12.3 and 12.4 on the longitudinal surfaces of the forming zone 6 are likewise formed by sealing walls 15.1 and 15.2. The sealing walls 15.1 and 15.2 each include adjustable wall ends 29.1 and 29.2 opposite the entry end 10. The wall ends 29.1 and 29.2 can be adjusted in an analog manner in relation to the respective adjusted feed opening 14, such that air turbulences of the secondary air flow can be advantageously prevented upon entry into the forming zone 6.

The sealing means for shielding the forming zone and for forming a feed opening depicted in the embodiment examples according to FIGS. 1-3 are exemplary. Fundamentally, the sealing rollers at the outlet end, for example, could be formed by means of a plate with an elastic sealing lip. Likewise, the feed opening at the entry end could simply be formed by means of damper flaps or blade shaped sealing means. Advantageously, the device according to the invention provides a defined or adjustable secondary air flow generated at the entry end.

| Reference Symbol List | |
|---|---|
| 1 | mixing chamber |
| 2 | fiber feed |
| 3 | forming head |
| 4 | forming outlet |
| 5 | sieve plate |
| 6 | forming zone |
| 7 | empty space |
| 8 | deposit belt |
| 9 | guide rollers |
| 10 | entry end |
| 11 | outlet end |
| 12.1, 12.2, 12.3, 12.4 | sealing means |
| 13 | sealing roller |
| 14 | feed opening |
| 15.1, 15.2 | sealing wall |
| 16 | suction device |
| 17 | suction channel |
| 18 | sealing plate |
| 19 | pivotal axis |
| 20.1, 20.2 | actuator |
| 21 | air guidance means |
| 22.1, 22.2 | support arm |
| 23 | fibrous layer |
| 24 | roller rack |
| 25 | roller motor |
| 26 | control device |
| 27 | sensor |
| 28 | cleaning agent |
| 29.1, 29.2 | wall ends |
| 30 | clearance |
| 31 | vacuum chamber |

The invention claimed is:

1. A device for the dry-forming of a fibrous web comprising:
   a. a forming head, to which a plurality of fibers or fiber mixtures can be fed via an air flow, and including a forming outlet for the generation of a fiber flow formed of fibers and air;
   b. an air permeable deposit belt for receiving and transporting the fibers, which acts together with a suction device for the generation of a suction flow,
   c. a forming zone having an empty space formed between the forming outlet of the forming head and the deposit belt wherein the empty space is shielded from the surrounding environment by a sealing means; and,
   d. a feed opening having an adjustable inflow cross-section in relation to the surrounding environment configured to adjustably supply a secondary air flow from a surrounding environment into the forming zone during operation, formed at the sealing means and disposed at an entry end in relation to the deposit belt.

2. The device according to claim 1, wherein the sealing means includes a moveable sealing plate formed at the entry end and which defines the inflow cross-section of the feed opening with its respective setting in relation to the deposit belt.

3. The device according to claim 2, wherein the sealing plate is mounted on a pivotal axis that extends transversally to and spaced from the deposit belt.

4. The device according to claim 1, wherein the sealing means includes a sealing roller disposed at an outlet of the forming zone and that can be driven at a circumferential speed.

5. The device according to claim 4, wherein the circumferential speed of the sealing roller is the same as a belt speed of the deposit belt.

6. The device according to claim 4, wherein the sealing roller is configured to be adjusted with respect to its distance from the deposit belt.

7. The device according to claim 4 further comprising a cleaning agent associated with the sealing roller so that the surface of the sealing roller can be cleaned.

8. The device according to claim 1 further comprising lateral sealing walls disposed on opposite longitudinal surfaces wherein each lateral sealing wall includes an entry end and a wall end that extends beyond the forming zone.

9. The device according to claim 8, wherein each wall end is configured to be extendable.

10. The device according to claim 8, wherein each sealing wall is configured to be transversally adjusted with respect to the deposit belt for adjustment of a deposit width.

11. The device according to claim 1, wherein the forming head is configured to be adjusted with respect to its distance from the deposit belt.

12. The device according to claim 1, wherein the suction device includes a plurality of air guidance means beneath the forming zone to create an adjustable suction profile in a direction of the running of the deposit belt.

* * * * *